US008079230B2

(12) United States Patent
Frank et al.

(10) Patent No.: US 8,079,230 B2
(45) Date of Patent: Dec. 20, 2011

(54) FOOD DISPENSING MACHINE

(75) Inventors: Jimmy I. Frank, Houston, TX (US);
Thomas L. Guy, San Antonio, TX (US);
Kristan L. Dawson, Brookside, TX
(US); Raymond A. Glatt, San Antonio,
TX (US); Richard E. Frankenberger,
San Antonio, TX (US); Carl R. Martin,
Burton, TX (US); Craig Cloud, New
Braunfels, TX (US)

(73) Assignee: FBD Partnership, LP, San Antonio, TX
(US)

( * ) Notice: Subject to any disclaimer, the term of this patent is extended or adjusted under 35 U.S.C. 154(b) by 709 days.

(21) Appl. No.: 11/467,852

(22) Filed: Aug. 28, 2006

(65) Prior Publication Data
US 2007/0062212 A1    Mar. 22, 2007

Related U.S. Application Data

(60) Provisional application No. 60/596,052, filed on Aug. 26, 2005.

(51) Int. Cl.
*A23L 3/36* (2006.01)
*F25D 3/00* (2006.01)
*B67D 7/80* (2010.01)
*B67D 1/08* (2006.01)
*B67D 7/56* (2010.01)
*B65D 88/54* (2006.01)

(52) U.S. Cl. ......... 62/303; 62/389; 222/146.6; 222/148; 222/155; 222/318

(58) Field of Classification Search .................... 62/303; 222/148
See application file for complete search history.

(56) References Cited

U.S. PATENT DOCUMENTS

| 1,075,898 | A | * | 10/1913 | Champ et al. ................. 222/148 |
| 2,023,854 | A | * | 12/1935 | Sabatino ...................... 134/98.1 |
| 2,969,073 | A | * | 1/1961 | Du Broff ....................... 134/152 |
| 3,638,448 | A | * | 2/1972 | Raymer .......................... 62/233 |
| 4,058,383 | A | * | 11/1977 | Peterson ........................... 62/85 |
| 4,136,719 | A | * | 1/1979 | Kronseder et al. ................ 141/1 |

(Continued)

FOREIGN PATENT DOCUMENTS

DE            849 562 C      9/1952

(Continued)

OTHER PUBLICATIONS

International Search Report for Corresponding International Patent Application No. PCT/US2006/033535.

(Continued)

*Primary Examiner* — Frantz Jules
*Assistant Examiner* — Filip Zec
(74) *Attorney, Agent, or Firm* — Dicke, Billig & Czaja PLLC

(57) ABSTRACT

A food dispensing machine includes a product chamber with a dispensing valve connected to the product chamber and having an outlet through which a product contained in the product chamber is dispensed. The product chamber has a cleaning solution inlet connectable to a cleaning solution supply source for receiving cleaning solution into the product chamber. The product chamber further has an ingredient inlet alternatively connectable to either an ingredient supply source or the dispensing valve outlet. When the ingredient inlet is connected to the dispensing valve outlet, a re-circulating flow path is created, allowing for complete cleaning and sanitizing of the product flow path.

18 Claims, 7 Drawing Sheets

U.S. PATENT DOCUMENTS

| | | | | |
|---|---|---|---|---|
| 4,465,210 A | * | 8/1984 | Iwanami | 222/148 |
| 4,516,596 A | * | 5/1985 | Sugisawa et al. | 137/240 |
| 4,560,091 A | * | 12/1985 | Souren | 222/155 |
| 4,685,592 A | * | 8/1987 | Vanderjagt | 222/148 |
| 4,736,600 A | * | 4/1988 | Brown | 62/342 |
| 4,848,381 A | * | 7/1989 | Livingston et al. | 134/57 R |
| 5,336,334 A | * | 8/1994 | Johnson | 134/22.12 |
| 5,348,058 A | * | 9/1994 | Ruhl | 141/1 |
| 5,410,888 A | * | 5/1995 | Kaiser et al. | 62/136 |
| 5,553,743 A | * | 9/1996 | Thompson et al. | 222/52 |
| 5,706,661 A | | 1/1998 | Frank | |
| 5,740,844 A | * | 4/1998 | Miller | 141/90 |
| 5,743,097 A | | 4/1998 | Frank | |
| 5,799,726 A | | 9/1998 | Frank | |
| 5,799,832 A | * | 9/1998 | Mayo | 222/135 |
| 5,806,550 A | | 9/1998 | Frank | |
| 5,984,148 A | * | 11/1999 | Andel et al. | 222/318 |
| 6,161,558 A | * | 12/2000 | Franks et al. | 134/57 R |
| 6,223,948 B1 | * | 5/2001 | Davis | 222/132 |
| 6,287,515 B1 | * | 9/2001 | Koosman et al. | 422/22 |
| 6,446,659 B2 | * | 9/2002 | Schroeder | 137/240 |
| 6,490,872 B1 | | 12/2002 | Beck et al. | |
| 6,536,224 B2 | | 3/2003 | Frank et al. | |
| 6,539,743 B2 | * | 4/2003 | Jones | 62/381 |
| 6,564,698 B2 | * | 5/2003 | Rolland | 99/452 |
| 6,625,993 B2 | | 9/2003 | Frank et al. | |
| 6,637,214 B1 | | 10/2003 | Leitzke et al. | |
| 6,889,603 B2 | * | 5/2005 | Carhuff et al. | 99/452 |
| 7,562,793 B2 | * | 7/2009 | Ufheil et al. | 222/148 |
| 2003/0126871 A1 | | 7/2003 | Frank | |
| 2004/0118291 A1 | * | 6/2004 | Carhuff et al. | 99/275 |
| 2006/0186137 A1 | * | 8/2006 | Till | 222/148 |

FOREIGN PATENT DOCUMENTS

| | | |
|---|---|---|
| DE | 12 59 913 B | 2/1968 |
| EP | 0 596 221 A1 | 5/1994 |
| EP | 0 598 223 A2 | 5/1994 |
| EP | 1 035 030 A1 | 9/2000 |
| FR | 2 600 978 A1 | 1/1988 |
| WO | 9321102 A1 | 10/1993 |
| WO | 03055326 A1 | 7/2003 |

OTHER PUBLICATIONS

Written Opinion for Corresponding International Patent Application No. PCT/US2006/033535.

Extended European Search Report for Corresponding European Application No. EP08009428.7.

Extended European Search Report for Corresponding European Application No. EP08009429.5.

* cited by examiner

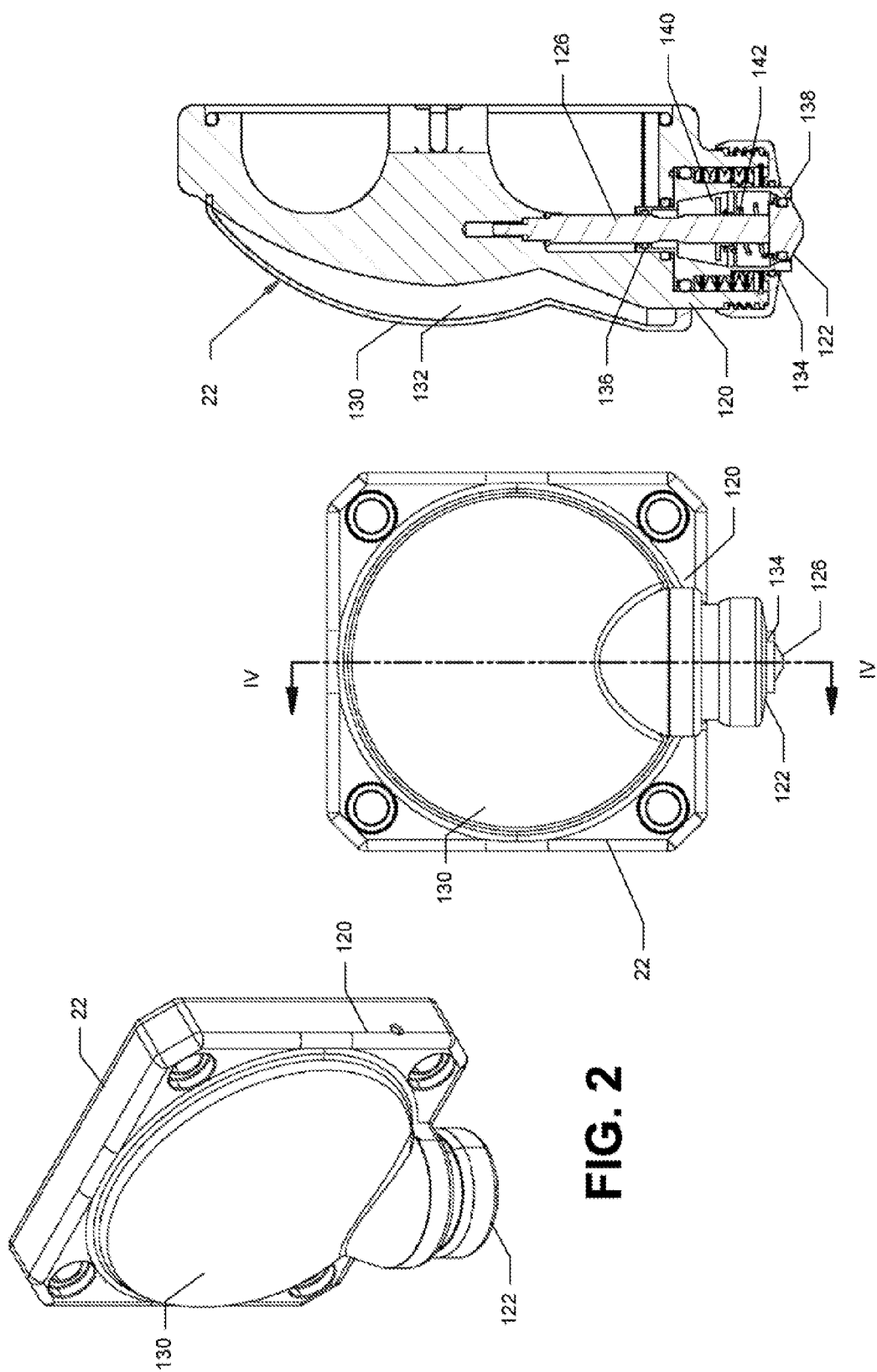

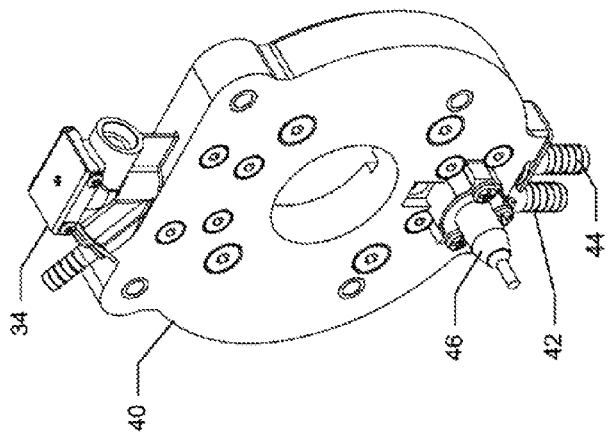
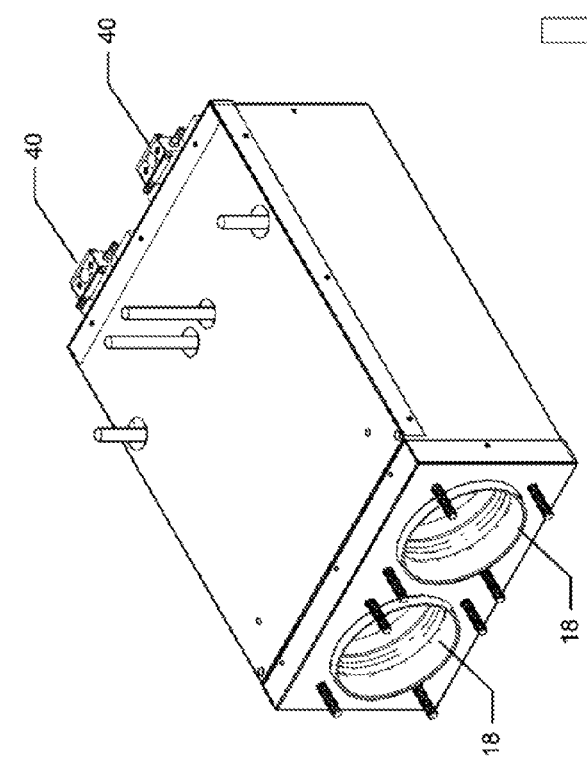
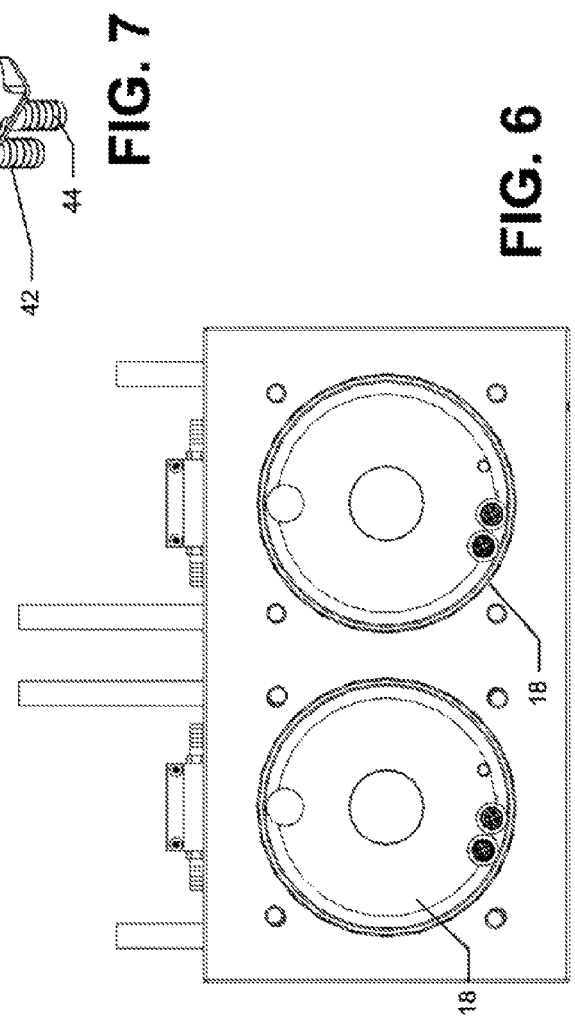

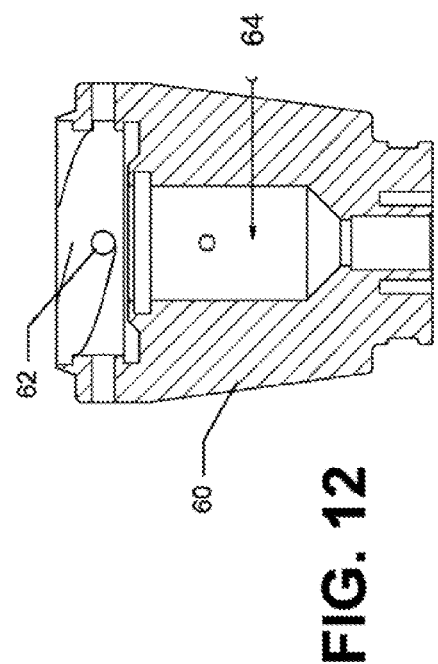
FIG. 12
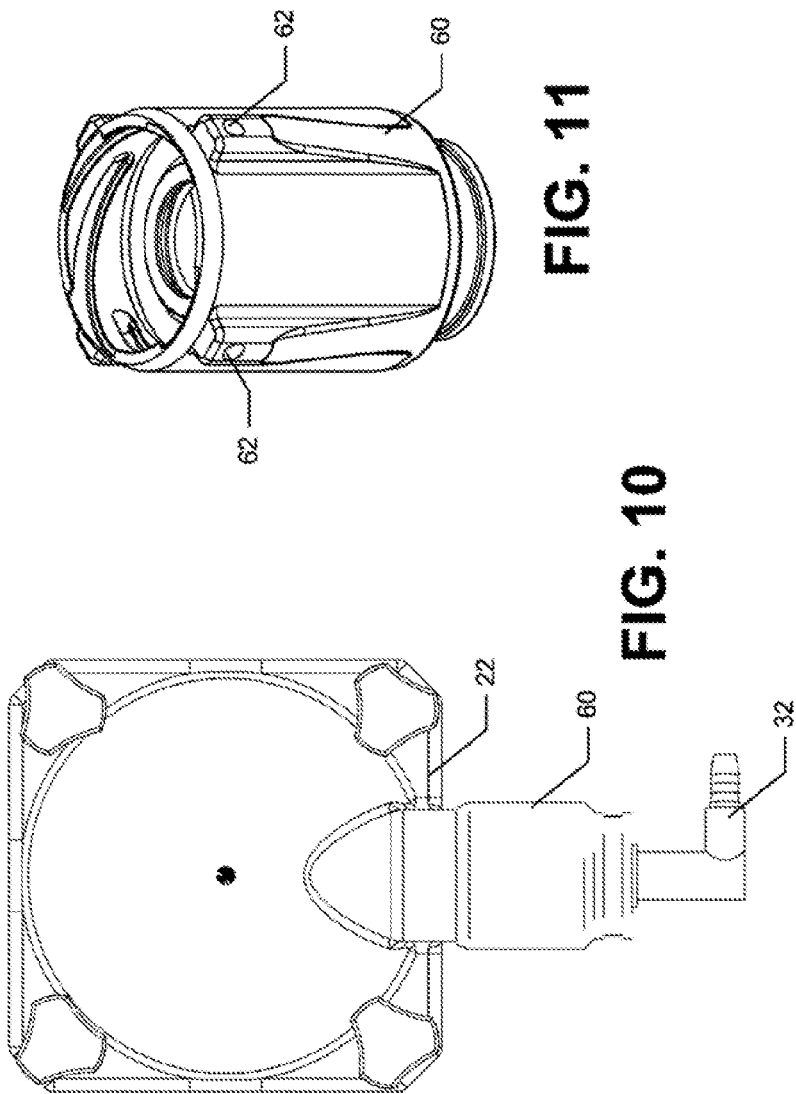
FIG. 11
FIG. 10

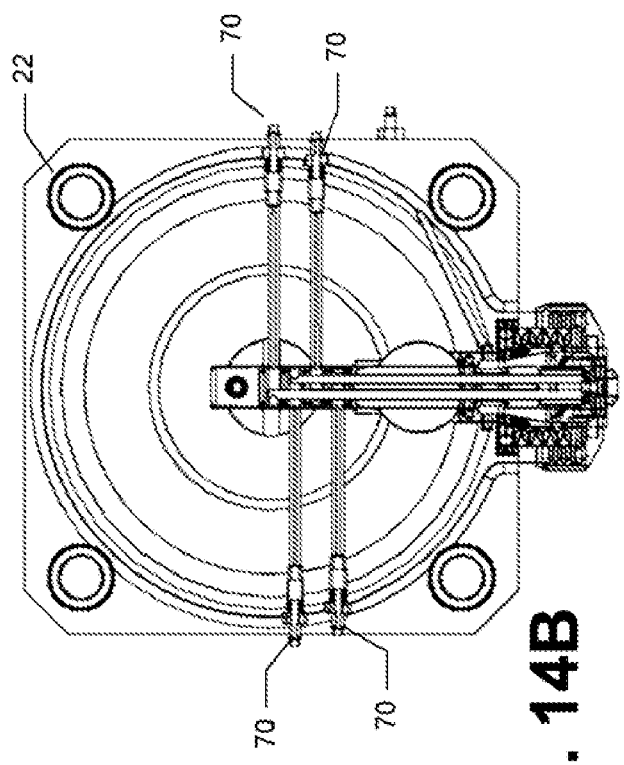
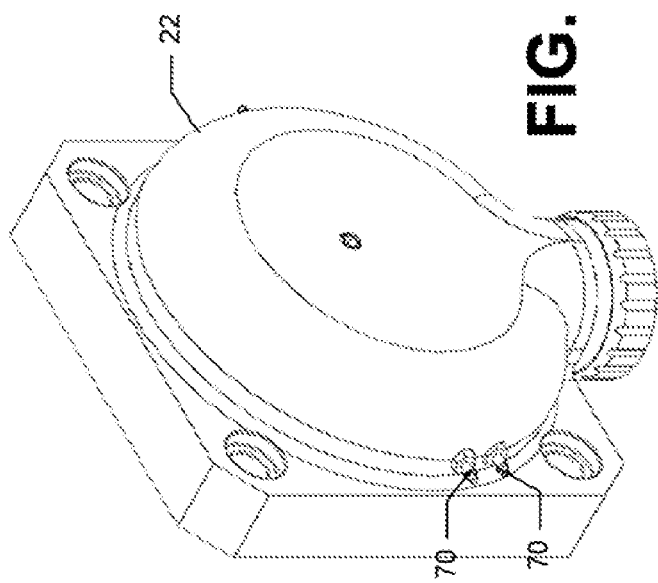
FIG. 14A
FIG. 14B

FOOD DISPENSING MACHINE

BACKGROUND

The present disclosure relates generally to machines for dispensing food products such as frozen beverage and dessert machines.

Dispensing machines that provide a food product such as a beverage or dessert from a product chamber via a dispensing valve are well known. For example, frozen beverage machines produce a frozen beverage by freezing a mixture of ingredients such as syrup, water and carbon dioxide in a mixing, or freezing, chamber. The freezing chamber is typically surrounded by a coil that contains refrigerant to cause freezing of the mixture inside to a desired level of consistency. The mixture is removed from the inner surface and mixed by a rotating shaft driving a scraping/mixing member attached to the shaft. The frozen mixture consistency is controlled by any of a number of methods that turns on the refrigeration to freeze and turns off the refrigeration when the mixture reaches the desired consistency. The product is then dispensed through a dispensing valve.

The typical scraper/mixer used in known frozen beverage machines is rotated by a motor. Such rotating scraper/mixers are at times subject to "freeze-up." This is a condition where the semi-frozen products attach themselves to the scraper-mixer and can continue to build until a solid cylinder is formed. This prevents mixing of the product in the freezing chamber. Since a frozen cylinder is formed, this can also reduce the dispensing capacity of the drink dispenser. Another problem created by the "freeze-up" is failure of the motor that drives the rotary mixer scraper. With rotating scraper/mixers, it is also observed that the "water-ice" freezes out first, thus attaching itself to the mixer/scraper. The remaining solution, since it is not as diluted with water, has an increased composition of solids and is thus not an acceptable product to be served to the customers.

Further, food dispensing machines, such as frozen beverage dispensing machines, typically must be cleaned and sanitized by manual disassembly and cleaning on a frequent basis. In order to sanitize a machine, the machine must first be clean of any debris that might harbor bacteria and might prevent a sanitizing agent from destroying the bacteria. Current manual cleaning methods used on what is known as an "open hopper" machine, and some sealed machines require the disassembly of all components that contact the dispensed product so as to thoroughly clean and sanitize the freezing chamber and delivery circuits of the open hopper machine. Open hopper machines typically use a premixed solution or can use a concentrated solution that must be either refrigerated or packaged in a manner that kills all bacteria prior to opening. Once open, some of these premixed solutions or concentrated solutions are subject to bacterial growths in a rapid time frame if not immediately refrigerated. Further, the unrefrigerated areas of the machine may be susceptible to bacteria growth when these types of solutions are used.

The manual method of cleaning and sanitizing relies upon the consistency of the persons cleaning and the rigorous compliance to the manual cleaning and sanitizing procedures. This is typically a problem and occurs with inconsistent results. Once cleaned, this can cause retention of bacteria. In addition, this cleaning must occur on a frequent basis as often as daily. Some machines include partially automated cleaning methods, though the automated cleaning capabilities may include significant limitations. For example, known machines having automatic cleaning capabilities might not address cleaning of the entire delivery circuit, dispensing valve and freezing chamber to a degree necessary to prevent bacteria formation and growth.

The present invention addresses shortcomings of the prior art.

SUMMARY

Exemplary aspects of the present disclosure include a food dispensing machine having a product chamber with a dispensing valve connected to the product chamber and having an outlet through which a product contained in the product chamber is dispensed. The product chamber has a cleaning solution inlet connectable to a cleaning solution supply source for receiving cleaning solution into the product chamber. The product chamber further includes an ingredient inlet alternatively connectable to either an ingredient supply source or the dispensing valve outlet. When the ingredient inlet is connected to the dispensing valve outlet, a re-circulating flow path is created, allowing for complete cleaning and sanitizing of the product flow path. In exemplary implementations, the machine produces and dispenses a frozen product. Thus, the product chamber may comprise a freezing chamber having a refrigeration system operatively associated therewith for refrigerating the freezing chamber.

To facilitate the connection of the ingredient inlet to the valve, an adapter has a first end that is connectable to the valve outlet and a second end that is connectable to the ingredient inlet. The adapter may activate a switch device when the adapter is connected to the valve outlet. This prevents initiating cleaning of the machine unless the adapter is connected to the valve. The exemplary adapter further includes a device allowing flow through the adapter in response to being connected to the ingredient inlet.

A mixing device is typically situated inside the product chamber. The mixing device is driven by a motor having a controller operatively connected to the motor. If necessary, the controller increases the motor speed when the machine is being cleaned. In some implementations, the controller also reverses the rotation direction of the mixing device in a predetermined manner. In still further embodiments, the mixing device may be operated in an axial reciprocating motion. The controller also controls operation of the refrigeration system. In certain embodiments, the refrigeration system is controlled in response to motor power, calculated by the controller using indications of the motor voltage and current.

The dispensing valve, which may be automatically operated by the controller in some embodiments or manually operated in other embodiments, includes a valve body with a valve stem attached to the valve body such that the valve stem is in a fixed position relative to the valve body. A nozzle assembly receives the valve stem and defines the valve outlet, and the nozzle assembly is movable with respect to the valve stem to selectively open and close the valve. A cover plate may be affixed to the valve body so as to define an air gap between the cover plate and the valve body to prevent condensation from forming on the valve.

BRIEF DESCRIPTION OF THE DRAWINGS

Other objects and advantages of the invention will become apparent upon reading the following detailed description and upon reference to the drawings in which:

FIG. 2 is a perspective view of a dispensing valve in accordance with the teachings of the present disclosure.

FIG. 3 is a front view of the valve shown in FIG. 2.

FIG. 4 is a side section view of the valve taken along line IV shown in FIG. 3.

FIG. 5 is a perspective view of a cold pack assembly in accordance with the teachings of the present disclosure.

FIG. 6 is a front view of the cold pack assembly shown in FIG. 5.

FIG. 7 is a perspective view of a motor plate for mounting to the cold pack assembly.

FIG. 10 is a front view of the dispensing valve further including a sanitizing line connected to the valve with an adaptor.

FIG. 11 is a perspective view of an adapter for attaching a sanitizing line to a dispensing valve outlet.

FIG. 12 is a section view of the adapter shown in FIG. 11.

FIGS. 14A and 14B illustrate a valve having inlets for receiving multiple flavorings.

Figure 1:
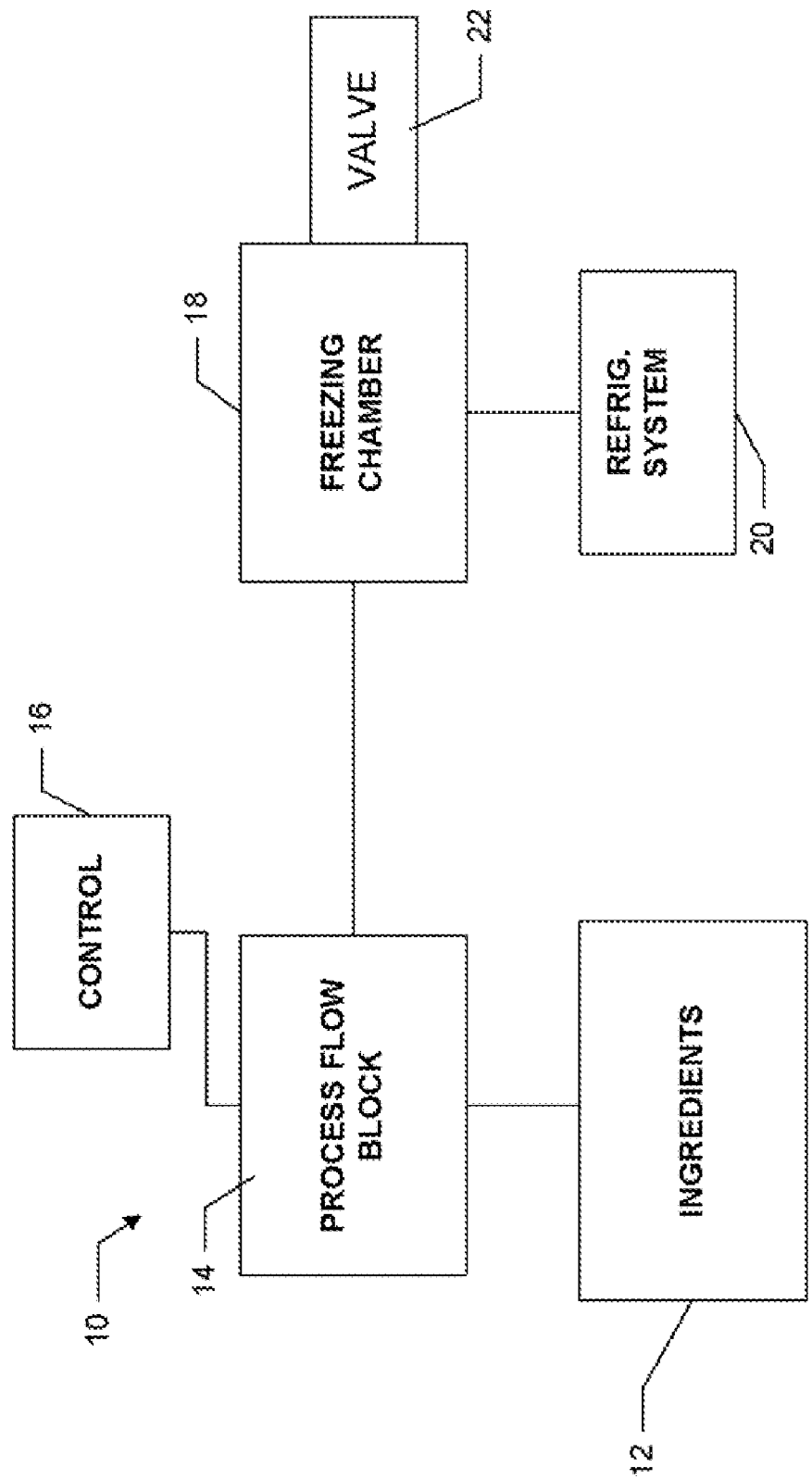
FIG. 1 is a block diagram conceptually illustrating portions of a food dispensing machine in accordance with the teachings of the present disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The teachings of this disclosure provide modifications and improvements to frozen beverage machines, such as the machines and systems disclosed in U.S. Pat. Nos. 5,706,661; 5,743,097; 5,799,726; 5,806,550; 6,536,224 and 6,625,993 by J. I. Frank et al. The entire disclosures of these patents are incorporated by reference.

FIG. 1 is a simplified block diagram schematically illustrating components of a food dispensing machine 10 in accordance with certain teachings of the present disclosure. In FIG. 1, the food dispensing machine 10 is a frozen beverage machine. The dispensing machine 10 includes an ingredients supply source 12, a process flow block 14, a controller 16, and a product chamber 18. In the exemplary frozen beverage machine 10, the ingredient supply source 12 may include, for example, a water supply, syrup supply and a gas supply 23. In the illustrated embodiment, the product chamber 18 comprises a freezing chamber having a refrigeration system 20 associated therewith. The dispensing system 10 typically includes two freezing chambers 18 that are cooled with a single refrigeration system 20, though the system 10 may include a single chamber 18 or more than two chambers 18 that may be refrigerated via one or more refrigeration systems 20.

Ingredients for a frozen beverage mixture are provided from the ingredient supply 12 to the process flow block 14, which controls the flow of the ingredients into the freezing chamber 18 as directed by the controller 16. The controller 16 may comprise an appropriately programmed microprocessor and suitable memory devices. The frozen mixture consistency is controlled by any of a number of methods that turns on the refrigeration system 20 to freeze and turns off the refrigeration system 20 when the mixture reaches the desired consistency. Suitable operation of the controller 16 and other control instrumentation is described, for example, in U.S. Pat. No. 5,706,661 incorporated by reference above. The product is then dispensed through a dispensing valve 22.

The dispensing machine 10 includes automated cleaning and sanitizing capabilities that insure rigorous cleaning and sanitizing of internal components of the machine 10. The exemplary machine 12 includes an automated dispensing valve 22, which is designed in such a way that the valve and the entire circuit that contains the food product can be cleaned and sanitized with a minimum of operator involvement. The valve 22 is microprocessor controlled (for example, using the controller 16) and thus can be manipulated via a computer program allowing for opening and closing and cycling as required to insure adequate cleaning and sanitizing. The dispensing valve 22 is shown in FIGS. 2-4. The valve 22 includes a valve body 120 that defines an outlet 122 through which the beverage mixture exits the frozen beverage machine 10.

Most components of the valve assembly 22 are constructed from stainless steel or molded plastic. As shown in the side view of FIG. 4, the valve 22 presents a thin profile, allowing a large surface of the valve to be in direct contact with the refrigerated freezing chamber 18, keeping the valve cold and retarding the growth of contaminates. The valve assembly 22 includes a cover plate 130 that defines a different curvature than that of the valve body 120. Thus, when the cover plate 130 is situated over the valve body 120 and affixed thereto, an air gap 132 is defined between the cover plate 130 and the valve body 120. This construction helps prevent condensation resulting from the thin profile of the valve assembly 22.

Since many typical food products dispensed from the machine 10 are pressurized, the product dispensed from the valve 22 may be pressurized. The design of the valve therefore helps insure that as the valve opens it does not spray due to turbulence in reducing pressures from approximately 10-40 psig to atmospheric. An additional external nozzle would help accomplish this, but the external nozzle might retain liquid that would be exposed to atmospheric conditions and possible contamination. Thus, the illustrated valve 22 does not include an external nozzle.

In a typical valve design, the valve is actuated either manually or automatically to open by raising a valve stem from a valve seat and to close by dropping the stem back into the seat. The disclosed valve 22 maintains a valve stem 126 stationary and allows a nozzle 134 to move up and down to provide dispensing or sealing. By doing this, as the valve opens and the nozzle 134 drops down to initiate flow, the nozzle 134 provides a partial barrier to the spray that results from the depressurized liquid.

In order to allow the nozzle 134 to drop down far enough to provide an effective nozzle length, an upper seal 136 is provided that maintains its seat until a lower seal 138 is unseated. This allows a partial drain and the reduction of any pressure built up in the valve cavity. This also reduces the hydraulic effect on the valve cavity that causes spraying prior to the extension of the nozzle.

Since the liquid retained in the valve would be trapped in an area that would be sealed at the top entry to the valve cavity by a seal in addition to the seal at the exit to the valve cavity, the stem and the seals are designed such that that as the valve closes the upper seal 136 seats first allowing the liquid trapped to partially drain prior to the lower seal 138 seating thus preventing pressure from being trapped in the valve cavity. If the pressure were trapped, the valve may "spit" upon opening. In addition, when the valve opens, the lower seal 138 unseats first allowing the nozzle 134 to drop down far enough to prevent spray prior to the upper seal 136 coming off its seat and also release any pressure in the valve cavity. In other embodiments, the lower seal 138 is omitted. To prevent drainage, the gap between the valve stem 126 and nozzle 134 is kept small.

The exemplary valve 22 is microprocessor controlled and is actuated by opening a gas solenoid that directs pressurized gas though a faceplate on a freezing cylinder to a pressure plate that is attached to the valve nozzle 134. Springs are situated relative to the valve stem 126 to bias the valve 22 in a normally closed position. When the valve 22 is actuated, the nozzle 134 lowers placing force against the springs that maintain the valve 22 in the normally closed position. The springs are designed such that they will not allow the valve 22 to open under normal operating pressures. In the event of an overpressure of the chamber 18, the springs are sized to act as a safety vent to prevent rupture of any component.

The valve is designed to be actuated either by manually pressing a dispense button that interacts with the microprocessor or during an automated cleaning and sanitizing process to be completely controlled by a computer program that instructs the valve when to open and when to close in order to effect the cleaning and sanitizing process. The valve could also be actuated with a manual valve handle actuating a switch to open.

In order to control the flow from the pressurized freezing chamber, the internal mechanism is designed to reduce pressure in a stepwise manner to provide a smooth flow path from the valve. The illustrated exemplary valve includes a restricted flow through an annular area surrounding the stem. As the flow passes through the annular area, it impinges on the spring loaded plate 142 that further reduces the energy left in the flow and provides a smooth flow from the outlet 122 of the extended nozzle 134.

FIGS. 5 and 6 illustrate an example of the "cold pack" assembly containing the freezing chamber 18. The illustrated embodiment includes two freezing chambers 18, though other numbers of freezing chambers are employed in alternative embodiments. A motor plate 40 is attached to the freezing chamber 18 at the back of the cold pack. FIG. 7 is a perspective view of an exemplary embodiment of the motor plate 40. The motor plate 40 defines 2 inlets 42, 44. For example, one inlet 42 is for receiving an ingredient such as syrup, and the other inlet 44 is for receiving water. In the illustrated embodiment, the water inlet 44 is further connected to a source of sanitizer. Each of the inlets 42, 44 includes a check valve so that only flow into the chamber 18 is permitted.

The motor plate 40 further includes a vent valve 34, which is provided to vent excess air or gases from the chamber 18 prior to filling. Excess air in the food product mixed in the chamber 18 can cause higher than acceptable air content in some products, which is not acceptable in some applications. A pressure transducer 46 is situated in the motor plate 40 to information regarding pressure inside the chamber 18 to the controller 16 for controlling operation of the machine 10.

Figure 9:
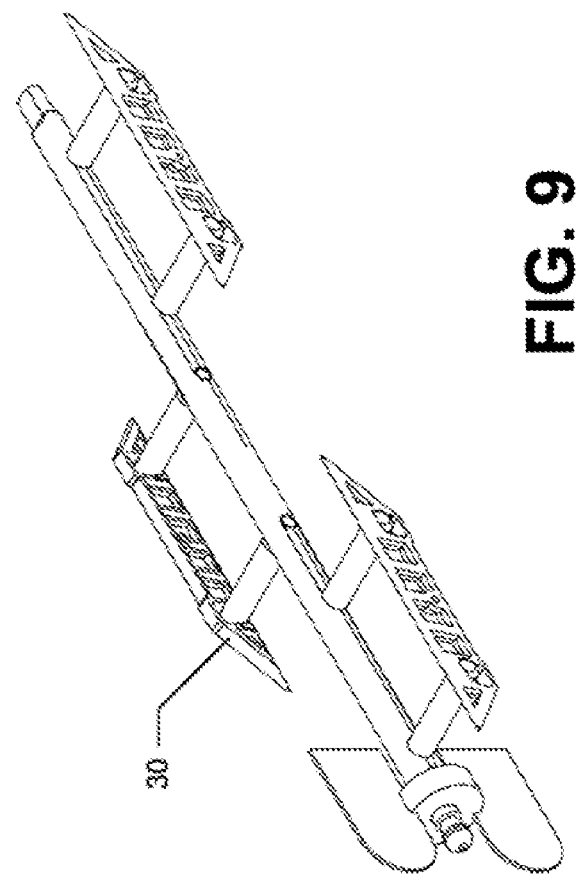
FIG. 9 is a perspective view of a beater bar in accordance with the teachings of the present disclosure.
Figure 8:
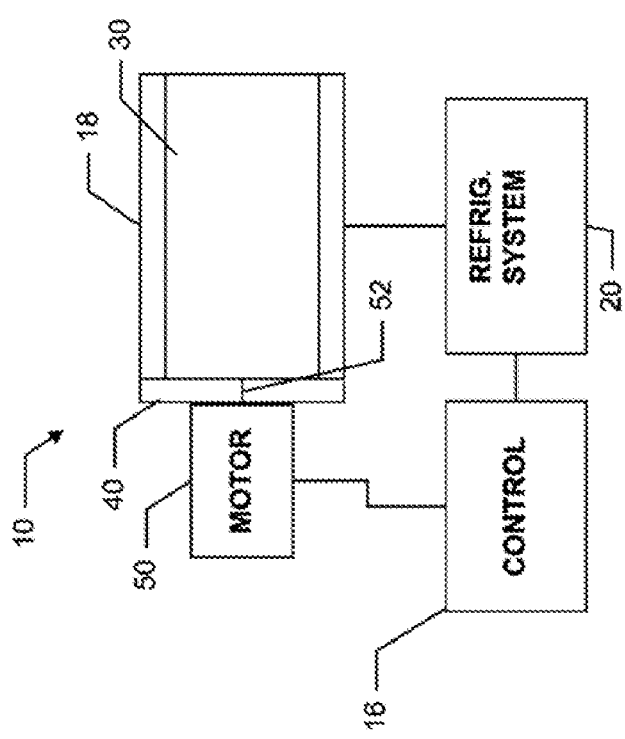
FIG. 8 is a block diagram conceptually illustrating portions of the food dispensing machine.

FIG. 8 conceptually illustrates additional aspects of the dispensing machine 10. A mixer/scraper, or "beater bar" 30 is situated inside the freezing chamber 18 to mix and scrape the food product contained therein. FIG. 9 shows an embodiment of an exemplary beater bar 30. A motor 50 is received by the motor plate 40 having the beater bar 30 connected to a shaft 52 of the motor 50 that extends into the chamber 18. The controller 16 controls operation of the motor 50 to mix the product contained in the chamber 18 as desired. With known rotating mixer/scraper devices, "freeze-up can occur, which is a problem where the food product inside the chamber freezes to the rotating beater bar. The beater bar is typically rotated at a constant speed in one direction, which creates a flow pattern conducive to freeze-up.

To address problems such as freeze-up associated with rotating scraper/mixer devices, certain embodiments of the dispensing machine 10 disclosed herein periodically change the rotation direction of the beater bar 30. Generally, the beater bar 30 will scrape product from the inside surface of the chamber 18 when it turns in one direction, and will not scrape when turned in the opposite direction. The controller 16 is programmed to rotate the beater bar 30 in one direction for a predetermined time interval, then reverse the rotation direction for a predetermined time period. In one implementation, the beater bar is rotated in each direction for one minute when the machine 10 is not in a freezing mode, with the refrigeration system 20 cooling the freezing chamber 18. When in the freezing mode (refrigeration system 20 on), the beater bar 30 is rotated in the scraping direction only. If the beater bar 30 construction provides scraping in either rotation direction, then the rotation direction can be periodically reversed whether in the freezing mode or not. Further embodiments are envisioned wherein the rotation direction is changed based on variables other than time.

In still other embodiments, the beater bar 30 uses an axial reciprocating motion, rather than a rotary motion. This can significantly increase turbulence of the mixing and can eliminate the rotary seal located on the shaft of the drive motor rotating the mixer/scraper. The rotary seal can be replaced with a bellows design that allows adequate axial motion to scrape the walls of the cylinder.

The reciprocating mixer-scraper can be driven axially by a number of drivers which include, but are not limited to, gas actuators, electric actuators or electric motors situated perpendicular to the axial motor of the mixer-scraper with a cam device mounted on the shaft to provide the necessary travel. This reciprocating motion provides thorough mixing and/or scraping and can eliminate the service issues of a rotary seal with a rotary drive shaft.

In some embodiments of the dispensing machine 10, water and syrup are kept separate until they enter the freezing chamber 18. As shown in FIG. 7, separate syrup and water supply lines are connected to inlets 42, 44 of the chamber 18 from the respective source. In other embodiments, a mixing block receives ingredients from the supply 12, such as water and syrup, to mix the ingredients prior to entry to the freezing chamber 18. Mixing the ingredients prior to entering the freezing chamber insures that the ingredients do not freeze separately during the freezing process. One such mixing block is disclosed in incorporated U.S. Pat. Nos. 6,536,224 and 6,625,993. In other embodiments, the mixing block is machined into the supply inlet that connects the ingredients supply with the back of the freezing chamber 18 to insure that the mixed solution remains cold enough to prevent accelerated bacteria growth and to simplify the circuit of entry to allow complete cleaning and sanitizing.

The cleaning and sanitizing functions of the dispensing machine 10 allow a user to disconnect the ingredient inlet 42 of the product chamber 18 from an ingredient source, such as a syrup bag-in-box ("BIB") and connect directly to the dispensing valve 22 outlet through a connector. Once connected in this manner, the flow circuit forms a complete re-circulating loop that can now pump cleaning, sanitizing and rinsing solutions in a continuous manner throughout the syrup delivery and freezing systems.

In order to initiate the cleaning process, a hose that previously connected the syrup supply to the freezing chamber inlet is disconnected from the syrup supply and reconnected to an adapter 60 surrounding the dispensing valve. FIG. 10 shows the ingredient supply line 32 attached to the valve 22 in this manner. By doing this, a complete re-circulating circuit is established that causes liquid to be pumped from the freezing chamber 18, through the valve 22 and throughout the complete syrup circuit, freezing chamber and also exposed associated components. When the cleaning process is complete, the line 32 is disconnected from the valve 22 and reconnected to the syrup supply. The freezing chamber 18 is automatically or manually refilled with syrup and water and the machine 10 is brought back into operation.

FIG. 11 is a perspective view of the adapter 60, and FIG. 12 is a section view. The illustrated adapter 60 is threaded onto the valve 22, though other suitable attachment methods could be used. If an operator of the machine 10 attempts to initiate a cleaning operation of the machine without connecting the line 34 to the valve 22, cleaning solution could flow from the chamber 18 through the open valve 22. To insure the adapter is in place, a switch mechanism is provided that only allows the CIP operation to start if the adapter 60 is in place. In the illustrated embodiment, the adapter 60 includes a magnet 62 that activates a switch in the machine when the adapter 60 is secured to the valve. To insure that the line 34 is connected to the adapter 60, the adapter further includes a check valve 64, that prevents flow through the adapter 60 unless the line 34 is connected to the adapter 60.

Figure 13:
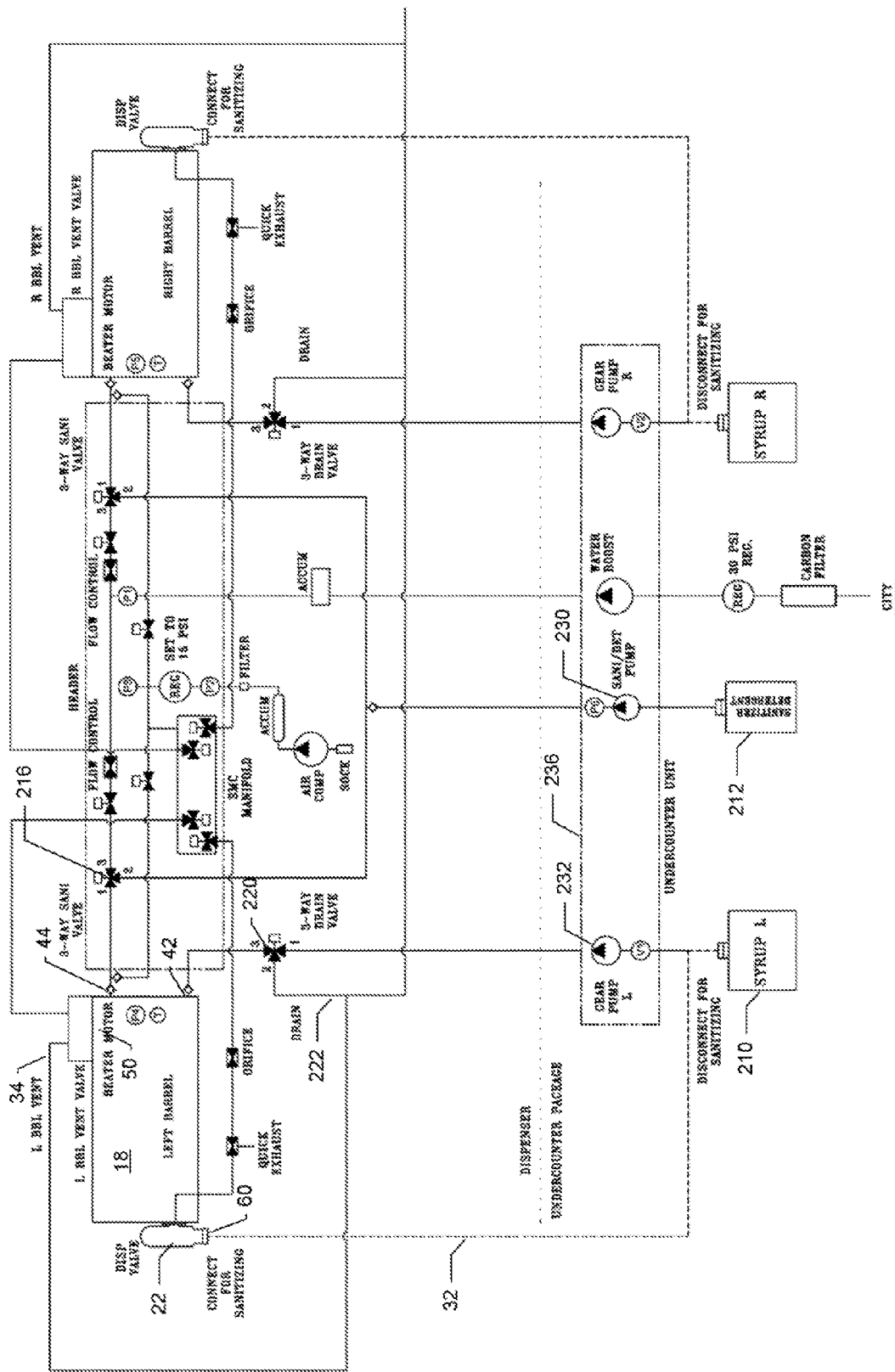
FIG. 13 is a flow diagram illustrating aspects of the automated cleaning capabilities of the food dispensing machine disclosed herein.

FIG. 13 is a block diagram showing the flow path for a particular embodiment of the dispensing machine 10 having two freezing chambers 18. For sake of simplicity, the description of FIG. 13 is primarily directed to the left freezing chamber 18 and associated components, with the understanding that the right freezing chamber 18 and associated components are generally identical.

As noted above, the chamber 18 includes two inlets 42, 44. One inlet 42 is connectable to an ingredient source, such as a syrup BIB 210. The other inlet 44 is connectable to a cleaning solution source 212. The inlet 44 is also connected to a water source 214 to receive water that is mixed with the syrup 210 in the chamber 18. In the illustrated system, the cleaning solution 212 is also mixed with water via a three-way valve 216 before it is received into the chamber 18.

The supply line 32 alternatively connects the inlet 42 to either the syrup BIB 210 or the outlet of the dispensing valve 22 using the adapter 60. The dashed line 32 in FIG. 13 shows the re-circulating flow circuit when inlet 42 is connected to the valve 22. When connected in this manner, the syrup supply BIB 210 is not part of the flow circuit. The re-circulating circuit includes a three-way valve 220 that connects directly to a drain line 222 so that syrup, sanitizing, cleaning agent and rinse water can be drained at appropriate times in the cleaning/sanitizing cycle.

The illustrated cleaning cycle is automated and is microprocessor controlled via software (controller 16) to perform all cleaning and sanitizing functions through appropriate automated hardware. In addition, the software systems advise the operator of necessary cleaning and sanitizing cycles and prevent the machine from operation if cleaning is not completed or if temperatures in the cycle rise above permitted values for an unacceptable period of time that may cause accelerated bacterial growth.

The cleaning and sanitizing agents 212 are injected into the water supply line connected to the inlet 44 via the three-way valve 216 at appropriate intervals. The cleaning and sanitizing solution is a concentrated solution in a BIB that can be diluted with water and can reside inside or outside the machine 22. In this embodiment, it resides outside the unit in a cabinet or base cart. A sanitizing pump 230, syrup pumps 232 and water pump 234 reside in a clean-in-place ("CIP") pump enclosure 236 that is situated in a cabinet below the machine 22. The syrup pump 232 is situated so that it is part of the re-circulating flow loop. The line 32 connects between the syrup BIB 210 and the inlet of the pump 232 to pump the syrup to the chamber inlet 42 from the supply 210, or the line 32 connects the inlet of the pump 232 to the adapter 60. When connected in this manner, cleaning solution is circulated from the chamber 18, through the valve 22, and through the pump 232 back to the chamber inlet 42. The CIP pump enclosure 236 may also be used with "open hopper machines" to provide clean in place capabilities in such machines. The CIP pump 236 could alternatively reside in the machine 22 or be located in a remote location. A gear pump is suitable for the CIP pump 236, as it pumps high viscosities and can meter the ingredients into the freezing chamber 18. In other embodiments, flow control devices are used instead of, or in combination with a gear pump. Other types of pumps may be used if they can be cleaned in the CIP process.

Once the cleaning and sanitizing agents 212 are injected into the water, and the chamber 18 and syrup flow circuit is filled with cleaning solution, the mixer motor 50 that drives the scraper and mixing system is activated. The motor 50 is capable of multiple speeds and in this embodiment the motor speed is increased from the scraping speed to cleaning speed. In the current embodiment the speed is increased from 170 RPM to 340 RPM for cleaning. This insures extreme turbulence in the freezing chamber 18 to clean and sanitize all components. The syrup flow circuit pump 232 is then activated and the solution is re-circulated from the chamber 18, through the dispensing valve 22 and adapter 60, the line 32, and back to the freezing chamber 18 via the inlet 42 while agitation is applied to the freezing chamber.

The software controlled system then steps through a number of cycles of drain, clean, sanitize and rinse (the water can be heated to a high enough temp to remove fat or other hard-to-remove deposits—typically 120° to 130° F.) until the machine is clean and sanitized. As noted above, the machine 10 includes the vent valve 34 to vent excess air or gases from the chamber 18. To clean and sanitize the vent valve in the CIP process, the cleaning and sanitizing solution 212 can be allowed to overfill the freezing chamber 18 so that it runs out through the vent valve 18 to the drain line 222 and is then flushed to the drain. The syrup circuit line 34 is then removed from adapter 60, which is also removed from the dispense valve 22, and the syrup line 34 is re-reconnected to the BIB 232. The microprocessor-controlled system then refills the chamber 18 with syrup 210 and water to produce the food product.

The cleaning and sanitizing methods described can be used with premixed syrups or concentrates. When premixed syrups are used, the syrup and syrup delivery flow circuit must be refrigerated because the syrup and flow circuit are subject to bacteria grown at elevated temperatures. Products such as juice solutions (in a concentrated or premixed form) that form mold or yeast can also be used and cleaned using this CIP machine.

While the valve 22 disclosed herein is particularly applicable for use as an automated dispensing mechanism in a machine having automated cleaning capabilities, it also can be applied to food dispensing machines without such automated cleaning capabilities. Advantages of an automated valve such as the valve 22 include the ability to not allow dispense during times when the product is not ready to dispense. This would include times when the machine is turned off, the product is not ready to serve, or when dispensing may cause service and operational issues. In the case of a machine dispensing a frozen food product, the automated valve can prevent dispensing when the machine is in a defrost mode or when the product is not sufficiently frozen.

In order to control dispensed product consistency more closely in certain embodiments of the dispensing machine 10, the product viscosity in the chamber 18 is monitored by the controller 16 to determine when to turn the refrigeration system 20 on to freeze and off to stop freezing. The electronic assembly accomplishing this control is an electronic board sometimes referred to as a "watt board" herein. The watt board controls the motor 50, which may be a variable speed or single speed motor. It is especially useful in frozen beverage and desert equipment utilizing a mixer/scraper in the freezing chamber 18. It also has application where torque or mixers/scrapers must be monitored.

In the automated production of frozen beverages, it is critically important to control the formation of correctly sized ice crystals. Accordingly, a method to measure the degree to which the liquid has frozen or thawed is provided. The result of this measurement is used to control the refrigeration system to maintain a uniform drink.

Providing accurate measurement of ice formation is made difficult because:

Drink chemistry varies with differing flavors, sugar content, water conditions, degree of carbonation, and pressure.

For sanitary reasons it is desirable to make no physical contact with the consumable product.

The quality of the electric power available at the point of use varies widely.

Electric gear-motors exhibit losses due to friction in gears, bearings and seals. They also have electrical losses that manifest as heating.

The shape of the current waveform in an induction motor is not necessarily sinusoidal. The shape changes with changes in the input voltage, with capacitors in the motor, and with changes in the frozenness of the beverage.

The torque required to agitate the drink is a good measure of the degree of freezing; however it is difficult to directly measure this torque.

Previous attempts to determine product frozenness by measuring the motor current waveform have only been partly successful. This approach measures the changing shape of the current waveform in the motor. However, it is very sensitive to the input voltage and can fail completely in some geographical areas due to distortion and amplitude changes in the utility power.

The disclosed watt board uses a basic physics definition: torque equals mechanical power divided by rotational speed. Since the rotational speed of an induction motor operating well below its full load capability is nearly constant, torque is nearly proportional to mechanical power. Mechanical power is also equal to the electrical power minus the losses due to friction and in the motor windings. These losses are small compared to the usable power and are also nearly constant. Therefore torque is proportional to electrical power minus a small constant. Electrical power can be measured accurately and the constant subtracted.

In exemplary implementations, the controller 16 includes a special purpose integrated circuit that is used to measure the motor voltage and current and compute the electrical power. The integrated circuit makes this measurement for the motors. A microprocessor is used to control the integrated circuit, to scale the power reading, and to remove the small constant. Alternate methods can be used to measure the electrical power including similar integrated circuits, dedicated multipliers for the voltage and current, or analog to digital converters to digitize the waveforms. This can be applied anytime the torque supplied by a motor needs to be accurately measured. In addition to frozen beverage production these could include tumbling, mixing, grinding, stirring, lifting, and moving.

Other embodiments of the food dispensing machine 10 include a single chamber 18 or multiple chambers that contain a neutral base into which additives, such as different flavors, will be added when the product is dispensed. Such an embodiment may or may not include the automated cleaning capabilities described herein. The flavors are injected into the fixed stem of the valve 22 and inserted into the flow of neutral base as it exits the valve. FIGS. 14A and 14B illustrate an exemplary valve 22 having four conduits 70 connected to the stem 126 for injecting different flavors into the dispensed product as desired.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified and all such variations are considered within the scope and spirit of the invention.

What is claimed is:

1. A food dispensing machine, comprising:
a product chamber;
a dispensing valve connected to the product chamber and having an outlet through which a product contained in the product chamber exits the valve;
the product chamber having a cleaning solution inlet connectable to a cleaning solution supply source for receiving cleaning solution into the product chamber; and
the product chamber having an ingredient inlet;
an adapter having a first end and a second end, the first end being removably connectable to the valve outlet;
an ingredient line having a first end connected to the ingredient inlet and a second end alternatively connectable to one of an ingredient supply and the second end of the adapter, such that the food dispensing machine includes
a first configuration where the cleaning solution inlet is connected to the cleaning solution supply, the second end of the ingredient line is connected to the second end of the adapter, the first end of the adapter is connected to the outlet of the valve such that a recirculating loop is formed from the valve outlet through the ingredient line and through the product chamber to circulate the cleaning solution therethrough; and
a second configuration where the ingredient line second end is disconnected from the second end of the adapter, the first end of the adapter is disconnected from the valve outlet, and the second end of the ingredient line is connected to the ingredient supply such that ingredients are received into the product chamber and the product is selectably dispensed from the valve outlet;

the adapter including a check valve configured to allow cleaning fluid flow from the valve outlet through the adapter only if the second end of the ingredient line is connected to the second end of the adapter.

2. The food dispensing machine of claim 1, further comprising a second product chamber.

3. The food dispensing machine of claim 1, wherein the product chamber comprises a freezing chamber having a refrigeration system operatively associated therewith for refrigerating the freezing chamber.

4. The food dispensing machine of claim 1, wherein the first end of the adapter is threaded.

5. The food dispensing machine of claim 1, further comprising a switch device, wherein the adapter activates the switch device when the adapter is connected to the valve outlet.

6. The food dispensing machine of claim 1, further comprising: a mixing device situated inside the product chamber; a motor operatively connected to the mixing device; a controller operatively connected to the motor, wherein the controller is programmed to increase the motor speed when the machine is being cleaned.

7. The food dispensing machine of claim 6, wherein the controller is programmed to operate the motor to rotate the mixing device in first and second directions.

8. The food dispensing machine of claim 6, wherein the product chamber comprises a freezing chamber having a refrigeration system operatively associated therewith for refrigerating the freezing chamber, the controller being operatively connected to the refrigeration system and programmed to control the refrigeration system in response to the motor voltage and current.

9. The food dispensing machine of claim 1, further comprising a plurality of conduits in fluid communication with the dispensing valve for injecting additives to a product dispensed from the product chamber via the dispensing valve.

10. The food dispensing machine of claim 1, further comprising a flow control device connected between the ingredient inlet and the ingredient supply and operable to pump ingredients to the ingredient inlet when the ingredient inlet is connected to the ingredient supply.

11. The food dispensing machine of claim 10, wherein the flow control device includes a pump.

12. The food dispensing machine of claim 1, further comprising a three-way valve connected between the first end of the ingredient line and the ingredient inlet, the three-way valve further connected to a drain line and operable to selectively connect the outlet of the dispensing valve to the drain line.

13. The food dispensing machine of claim 1, further comprising the product chamber having a vent valve connected to a drain line.

14. The food dispensing machine of claim 1, further comprising a three-way valve connected between the cleaning solution inlet and the cleaning solution supply source, wherein the three-way valve is further connected to a water source and is operable to selectively connect the cleaning solution inlet to the cleaning solution supply source or the water source.

15. A method for cleaning a food dispensing machine, the dispensing machine including an ingredient supply source, a cleaning solution supply source, a product chamber having an ingredient inlet connected to the ingredient supply source and a cleaning solution inlet connected to the cleaning solution supply source, and a dispensing valve connected to the product chamber, the method comprising the steps of:

disconnecting the ingredient inlet from the ingredient supply source;

connecting an outlet of the dispensing valve to the ingredient inlet of the product chamber using an adapter;

pumping cleaning solution from the cleaning solution supply source into the product chamber;

circulating the cleaning solution through the product chamber, the dispensing valve and the ingredient inlet;

disconnecting the outlet of the dispensing valve from the ingredient inlet;

re-connecting the ingredient inlet to the ingredient supply source;

receiving ingredients into the product chamber via the ingredient inlet; and dispensing product through the outlet of the dispensing valve.

16. The method of claim 15, further comprising disconnecting the ingredient inlet from the ingredient supply source.

17. The method of claim 15, further comprising:

connecting a first end of the adapter to the valve outlet;

connecting a first end of the ingredient line to the ingredient inlet;

connecting a second end of the ingredient line to the second end of the adapter, wherein the adapter has a check valve configured to allow cleaning fluid flow from the valve outlet through the adapter only if the second end of the ingredient line is connected to the second end of the adapter.

18. A food dispensing machine, comprising:

a product chamber having a cleaning solution inlet and an ingredient inlet;

a dispensing valve connected to the product chamber and having an outlet through which a product contained in the product chamber is dispensed, the ingredient inlet of the product chamber being alternatively connectable to either an ingredient supply or the dispensing valve outlet;

an adapter a first end and a second end, the first end being removably connectable to the valve outlet;

an ingredient line having a first end connected to the ingredient inlet and a second end alternatively connectable to one of an ingredient supply and the second end of the adapter, such that the food dispensing machine includes a first configuration where the cleaning solution inlet is connected to the cleaning solution supply, the second end of the ingredient line is connected to the second end of the adapter, the first end of the adapter is connected to the outlet of the valve such that a re-circulating loop is formed from the valve outlet through the ingredient line and through the product chamber to circulate the cleaning solution therethrough; and a second configuration where the ingredient line second end is disconnected from the second end of the adapter, the first end of the adapter is disconnected from the valve outlet, and the second end of the ingredient line is connected to the ingredient supply such that ingredients are received into the product chamber and the product is selectably dispensed from the valve outlet;

a cleaning solution supply source connectable to the cleaning solution inlet of the product chamber for injecting cleaning solution into the circuit.

* * * * *